No. 780,233. PATENTED JAN. 17, 1905.
A. W. SCHEUBER.
SAFETY RAZOR FRAME.
APPLICATION FILED NOV. 6, 1903.
2 SHEETS—SHEET 1.
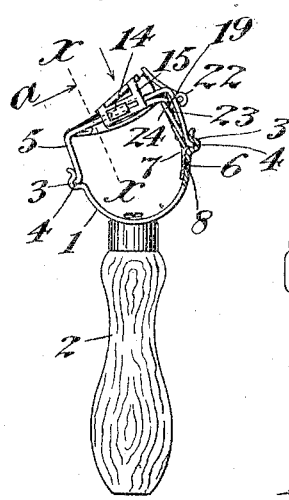
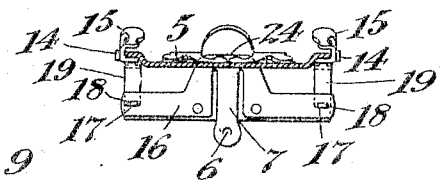
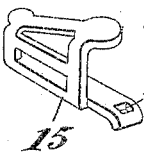
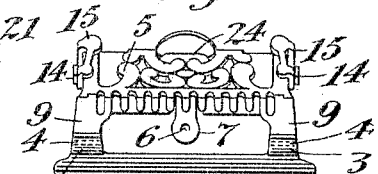
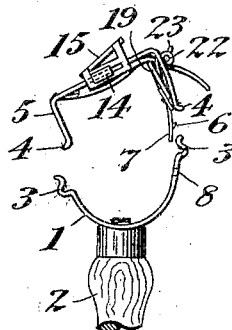
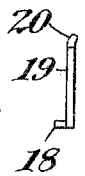
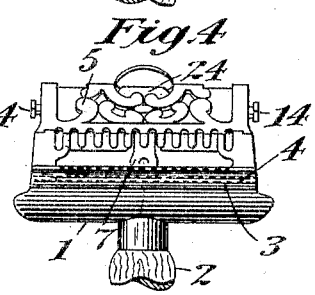
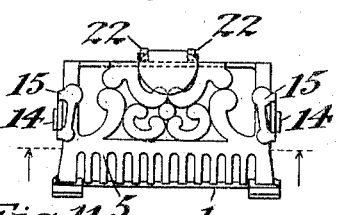
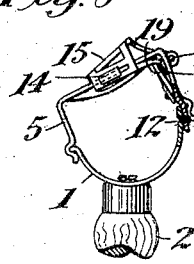
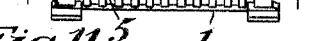
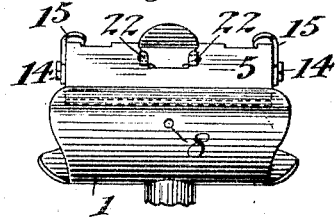
Witnesses:
Chas. W. King
Adolph P. Dymas
Inventor:
August William Scheuber
By his Attorney
Clifford E. Dunn No. 780,233. PATENTED JAN. 17, 1905.
A. W. SCHEUBER.
SAFETY RAZOR FRAME.
APPLICATION FILED NOV. 6, 1903.
2 SHEETS—SHEET 2.
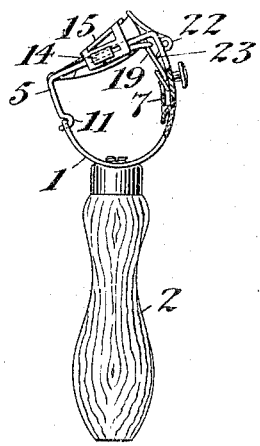
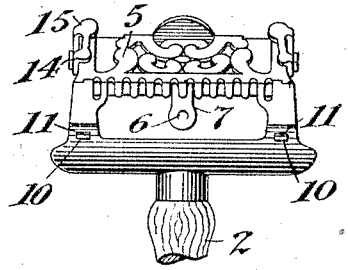
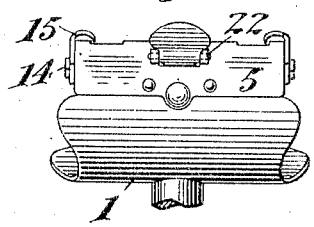
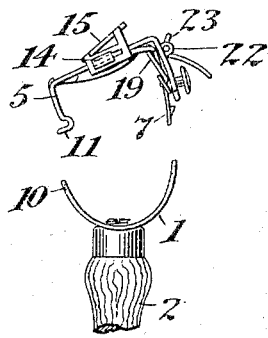
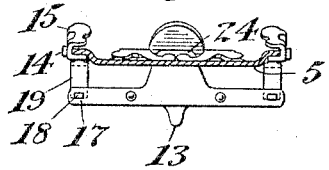
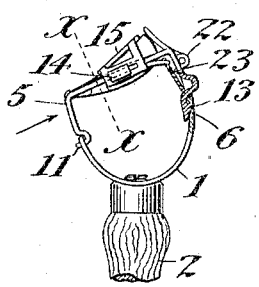
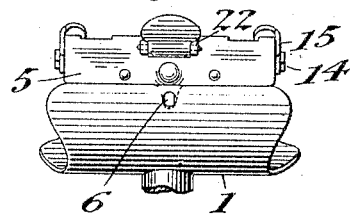
Witnesses:
Chas. D. King
Adolph P. Dimer
Inventor:
August William Scheuber
By his Attorney
Clifford E. Dunn.

No. 780,233. Patented January 17, 1905.

UNITED STATES PATENT OFFICE.

AUGUST WILLIAM SCHEUBER, OF HOBOKEN, NEW JERSEY.

SAFETY-RAZOR FRAME.

SPECIFICATION forming part of Letters Patent No. 780,233, dated January 17, 1905.

Application filed November 6, 1903. Serial No. 180,110.

*To all whom it may concern:*

Be it known that I, AUGUST WILLIAM SCHEUBER, a citizen of the United States, residing at Hoboken, in the county of Hudson and State of New Jersey, have invented certain new and useful Improvements in Safety-Razor Frames, of which the following is a full, clear, and exact specification.

My invention relates to a new and improved safety-razor casing or frame wherein is combined not only simplicity of construction and cheapness of manufacture, but which is also readily accessible in all its parts for cleaning and drying and easy to manipulate.

To obtain these results, my invention in its broadest aspect consists of a razor-frame wherein the blade-support is detachable from the casing and while easily secured thereto affords ready access for cleaning and drying. Several methods of securing the blade-support to the casing are shown in the drawings.

Another feature of my invention consists in providing a casing with self-adjusting sliding clips, and a third feature consists in providing a lip or finger-piece for bearing against the back of the blade, which lip is mounted in suitable bearings beyond the back of the casing in such a way that it may be turned back flat against the frame, thereby economizing space and facilitating packing.

In the accompanying drawings, illustrating typical embodiments of my invention, Figure 1 is an end view of the razor-frame with a portion shown broken away for the sake of clearness. Fig. 2 is a sectional view of the blade-support, taken on lines $x\ x$ of Fig. 1 and looking in the direction of the arrow $a$; Fig. 3, a view of the complete razor-frame looking in the direction of the arrow $a$ in Fig. 1; and Fig. 4, a similar view to Fig. 3, but of a slightly-modified form of casing. Fig. 5 shows a rear view of the casing, Fig. 6 a top view thereof, and Fig. 7 a form of casing such as is indicated in Fig. 1, but showing the blade-support detached from the casing proper. Fig. 8 is a view similar to Fig. 1, but showing a modified form of my invention; and Figs. 9, 10, and 11 show enlarged details, which will be more particularly described hereinafter. In the second sheet of drawings, Fig. 12 is an end view of a further modification of my invention, a portion being broken away for the sake of clearness. Fig. 13 is a front view of the structure shown in Fig. 12, and Fig. 14 a rear view. Fig. 15 is a sectional view of the blade-support, taken on lines $x\ x$ of Fig. 18; Fig. 16, a rear view of the structure shown in Fig. 18; Fig. 17, a similar view to Fig. 12, but showing the blade-holder detached from the casing; and Fig. 18, a similar view to Fig. 12, but showing a still further modification of my invention.

The same numerals indicate like parts in all the drawings.

In the construction shown in Fig. 1, 1 represents the casing, to which is secured a suitable handle 2. The edges of this casing are formed into grooves or recesses 3, into which the tongues 4, formed from the flared edges of the blade-support 5, are adapted to be retained. In the construction shown the tongues 4 of the blade-support can be inserted into the ends of the grooves in the casing and the blade-support slid into position for shaving, and the projection 6 of the spring-tongue 7, entering the recess 8 of the casing, serves to maintain the parts in their proper position; but in some cases it may not be desirable to slide the blade-holder in place, and the metal of which the casing and blade-holder is constructed is ordinarily flexible enough to allow the latter to be sprung in place and maintained in operative position. In some cases I find it convenient to cut away the front portion of the blade-support, thus leaving the tongue projections only upon the end pieces 9, which will be found sufficiently rigid to hold the parts in place, (see Fig. 3;) but, if desired, the front portion of the blade-support may be left intact, and thus a continuous tongue running the whole width of the blade-holder may be employed, such a structure being shown in Fig. 4.

Another method of securing the blade-support to the casing is that shown in Figs. 12 to 18, inclusive, and in this case instead of a tongue-and-groove connection I have employed what may be termed a "hook-and-eye" connection. In this modification I provide the casing with suitable recesses 10, into which hook-shaped projections 11 on the blade-support are adapted to engage, and the blade-support as a whole is then clamped into place by some well-known means, such as a spring-tongue 7, similar to that already described. This spring-tongue may be such as I have used in other forms of safety-razors and such as I have shown in Fig. 2, where it is formed integral with the spring for actuating the clips and finger-piece; but in my present invention it is not essential that a separate spring for securing the parts together or for holding them in the adjusted position be provided, as this spring may be entirely omitted and the casing and blade-support themselves be adapted for or supplied with the necessary means for maintaining the parts in proper position. In Fig. 8, for instance, is shown a structure wherein a ball-and-socket arrangement is employed, the edges of the casing in this instance being formed into suitable tongues and the blade-support being supplied with grooves at its edges for receiving the tongues, the ball-and-socket connection being interposed at any suitable point for maintaining the parts in proper relative position. Still another form is that shown in Fig. 18, wherein the rear portion of the blade-support itself is formed into a hook 13, engaging a suitable recess 6 in the casing, the resiliency of the metal of the blade-support being sufficient to allow the parts to be sprung together.

Another feature of my present invention consists in providing the casing with longitudinally-sliding clips which are self-adjusting upon inserting the blade in place, and one typical form of construction is shown in the drawings herein. As will be seen, lugs or projections 14 extend outwardly from the edges of the top of the blade-support and clips 15, an enlarged view of one of which is shown in Fig. 9, are fitted to slide upon the stud or projection 14, as will be seen in Figs. 1, 7, 8, &c., the ends of the projections 14 being flattened to retain the clips in place though without interfering with their longitudinal movement. Means are then provided for maintaining the clips normally in a rearward position—for instance, as shown in Fig. 7—and the means which I have shown to perform this function consist of the yoke-shaped spring 16, the ends of which are provided with recesses 17, into which the lugs 18 on the lower ends of the links 19 are adapted to engage, while the upper ends 20 of the said links engage the recesses 21 in the rear portions of the clips, as will be clearly seen from Figs. 9 and 10. It will be obvious that the clips being normally in their rearward position upon inserting a blade upon the blade-holder its upper face will bear against the clips and as it is moved forward to its operative position will move the clips against the torsion of the spring. It is evident that other means may be employed for retaining the clips in their normal position, and the means shown are merely a convenient way of doing it. In my present invention the lip or finger for bearing against the rear of the blade I have mounted in lugs 22, extending out from the back of the blade-support, and I find it convenient to roll them out of strips of metal formed from the material of the blade-support. The lip or finger when swung forward bears against the rear of the blade and maintains it in its adjusted position, as will be seen from an inspection of Fig. 1, and the lip is itself maintained in that position by reason of the lug 23, formed integral with it, being held firmly by the head 24 of the spring 16 bearing upon it. When the lip is swung back, the lug 23 is removed from contact with the spring and the lip can be swung flat against the rear of the blade-support, thus rendering the whole device compact and convenient.

The forms shown in the drawings are merely illustrations of ways of constructing my invention, and I do not limit myself to the particular combinations and devices shown and described; but

What I claim, and desire to secure by Letters Patent, is—

1. In a safety-razor frame, an open-ended U-shaped casing, a detachable blade-holder, a sliding connection between said casing and blade-holder, and means on the blade-holder for holding the blade in operative position, substantially as described.

2. In a safety-razor frame, an open-ended U-shaped casing having grooves or recesses formed integral therewith, a detachable blade-holder adapted to engage with the grooves or recesses in said casing, a sliding connection between said casing and blade-holder, a centering device for maintaining the blade-holder in proper position upon the casing, and means on said blade-support for holding the blade in operative position, substantially as described.

3. In a safety-razor frame, an open-ended U-shaped casing, a detachable blade-holder, a sliding connection between said casing and blade-holder, a centering device for maintaining the blade-holder in proper position upon the casing, and means on said blade-holder for holding the blade in operative position, substantially as described.

4. In a safety-razor frame, an open-ended U-shaped casing, a detachable blade-holder adapted to be secured to said casing, a sliding connection between said casing and blade-holder, a ball-and-socket centering device for maintaining the blade-holder in proper position upon the casing, and means on said blade-holder for holding the blade in operative position, substantially as described.

5. In a safety-razor frame, an open-ended U-shaped casing, a detachable blade-holder adapted to be secured by its edges to said casing, a sliding connection between said casing and blade-holder, a spring-actuated centering device for maintaining the blade-holder in proper position upon the casing, and means on said blade-support for holding the blade in operative position, substantially as described.

6. In a safety-razor frame, a casing having a blade-supporting portion, clips for holding the ends of the blade and a lip for bearing against the rear of the blade, said lip being adapted to be turned back flat against the rear of the casing, substantially as described.

7. In a safety-razor frame, a casing, a blade-holder movably secured to said casing, clips for holding the ends of the blade and a lip for bearing against the rear of the blade, said lip being adapted to be turned back flat against the rear of the blade-holder, substantially as described.

8. In a safety-razor frame, a casing having a blade-supporting portion, longitudinally-sliding clips normally tending to move toward the rear of the casing, and a lip for bearing against the rear of the blade and for moving it forward against the action of the clips, substantially as described.

9. In a safety-razor frame, a casing, a blade-holder movably secured thereto, longitudinally-sliding clips normally tending to move toward the rear of the casing and a lip for bearing against the rear of the blade and for moving it forward against the action of the clips, substantially as described.

10. A casing having a blade-supporting portion, self-adjusting longitudinally-sliding clips, and a lip adapted to bear against the rear of the blade, substantially as described.

11. A casing, a blade-support movably secured thereto, self-adjusting longitudinally-sliding clips, and a lip adapted to bear against the rear of the blade, substantially as described.

12. A casing having a blade-supporting portion, spring-actuated longitudinally-sliding clips, and a lip adapted to bear against the rear of the blade, substantially as described.

13. A casing, a blade-holder movably secured thereto, spring-actuated longitudinally-sliding clips, and a lip for bearing against the rear of the blade, substantially as described.

14. A casing having a blade-supporting portion, self-adjusting sliding clips, a lip for bearing against the rear of the blade and integral means for operating said clips and said lip, substantially as described.

15. A casing, a blade-holder movably secured thereto, self-adjusting sliding clips, a lip for bearing against the rear of the blade and integral means for operating said clips and said lip, substantially as described.

16. A casing having a blade-supporting portion, longitudinally-sliding clips, a spring on said casing, and a link connection between said clips and said spring, substantially as described.

17. A casing, a blade-holder movably secured thereto, longitudinally-sliding clips, a spring secured to said blade-holder, and a link connection between said clips and said spring, substantially as described.

18. A casing having a blade-supporting portion, longitudinally-sliding clips, a lip for bearing against the rear of the blade, and a single spring for operating said clips and said lip, substantially as described.

19. A casing, a blade-holder movably secured thereto, longitudinally-sliding clips, a lip for bearing against the rear of the blade and a single spring for operating said clips and said lip, substantially as described.

20. A casing having a blade-supporting portion, longitudinally-sliding clips, a lip for bearing against the rear of the blade, a single spring for operating said clips, and said lip, and a link connection between said clips and said spring, substantially as described.

21. A casing, a blade-holder movably secured thereto, longitudinally-sliding clips, a lip for bearing against the rear of the blade, a single spring for operating said clips and said lip, and a link connection between said clips and said spring, substantially as described.

22. A casing, a detachable blade-holder having a tongue-and-groove connection to said casing, self-adjusting clips, a lip for bearing against the rear of the blade and a single spring for operating said clips and said lip, substantially as described.

23. A casing, a detachable blade-holder having a tongue-and-groove connection to said casing, longitudinally-sliding clips, a lip for bearing against the rear of the blade and a single spring for operating said clips and said lip, substantially as described.

24. A casing having a blade-supporting portion, self-adjusting longitudinally-sliding clips, and means for maintaining the blade in operative contact with said clips, substantially as described.

25. A casing, a blade-support movably secured thereto, self-adjusting longitudinally-sliding clips and means for maintaining the blade in operative contact with said clips, substantially as described.

26. A casing having a blade-supporting portion, spring-actuated longitudinally-sliding clips and means for maintaining the blade in operative contact with said clips, substantially as described.

27. A casing, a blade-holder movably secured thereto, spring-actuated longitudinally-sliding clips and means for maintaining the blade in operative contact with said clips, substantially as described.

28. A casing, a detachable blade-holder having a tongue-and-groove connection with said casing and self-adjusting clips mounted on said blade-holder, substantially as described.

29. A casing, a detachable blade-holder having a tongue-and-groove connection with said casing and self-adjusting longitudinally-sliding clips mounted on said blade-holder, substantially as described.

30. A casing, a detachable blade-holder having a sliding connection with said casing and self-adjusting clips mounted on said blade-holder, substantially as described.

31. A casing, a detachable blade-holder having a tongue-and-groove connection to said casing, a centering device for maintaining the blade-holder in proper position upon the casing, self-adjusting clips, a lip for bearing against the rear of the blade and a single spring for operating said clips and said lip, substantially as described.

32. A casing, a detachable blade-holder having a tongue-and-groove connection to said casing, a centering device for maintaining the blade-holder in proper position upon the casing, longitudinally-sliding clips, a lip for bearing against the rear of the blade and a single spring for operating said clips and said lip, substantially as described.

33. A casing, a detachable blade-holder having a hook-and-eye connection to said casing and means for maintaining the blade in place upon the blade-holder, substantially as described.

34. A casing, a detachable blade-holder having a hook-and-eye connection to the casing, longitudinally-movable spring-operated clips and a lip for holding the blade in operative position upon the blade-holder, substantially as described.

35. A casing, a detachable blade-holder having a spring hook-and-eye connection to said casing and means for maintaining the blade in operative position upon said blade-holder, substantially as described.

36. A casing, a detachable blade-holder having a spring hook-and-eye connection to the casing, clips and a lip for maintaining the blade in operative position upon the blade-holder, substantially as described.

37. A casing, a detachable blade-holder having a hook-and-eye connection to said casing, self-adjusting clips and a lip for maintaining the blade in operative position upon the blade-holder, substantially as described.

38. A casing, a detachable blade-holder having a hook-and-eye connection to said casing, sliding clips and a lip for maintaining the blade in operative position upon the blade-holder, a spring for operating said clips and said lip, and a link connection between said spring and said clips, substantially as described.

In witness whereof I hereunto subscribe my name in the presence of two subscribing witnesses.

AUGUST WILLIAM SCHEUBER.

Witnesses:
ADOLPH F. DINSY,
CHAS. D. KING.